US008817118B2

(12) United States Patent
Hatanaka (10) Patent No.: US 8,817,118 B2
(45) Date of Patent: Aug. 26, 2014

(54) IMAGING SYSTEMS, MOVING BODIES, AND IMAGING CONTROL METHODS FOR REMOTE MONITORING OF A MOVING TARGET (75) Inventor: Hidekazu Hatanaka, Chiba (JP)

(73) Assignee: Empire Technology Development LLC, Wilmington, DE (US)

( * ) Notice: Subject to any disclaimer, the term of this patent is extended or adjusted under 35 U.S.C. 154(b) by 520 days.

(21) Appl. No.: 12/641,115

(22) Filed: Dec. 17, 2009

(65) Prior Publication Data
US 2011/0013032 A1 Jan. 20, 2011

(30) Foreign Application Priority Data

Jul. 16, 2009 (JP) ................................. 2009-167900

(51) Int. Cl.
*H04N 5/232* (2006.01)
(52) U.S. Cl.
USPC .................... 348/211.4; 348/211.99; 348/143
(58) Field of Classification Search
CPC ................................................. H04N 5/23203
USPC ..................................................... 348/211.4
See application file for complete search history.

(56) References Cited

U.S. PATENT DOCUMENTS

| 7,561,723 | B2 * | 7/2009 | Goldberg et al. ............. 382/115 |
| 7,761,231 | B2 | 7/2010 | Kawabe et al. |
| 8,035,687 | B2 * | 10/2011 | Nishiyama .................... 348/169 |
| 2002/0049728 | A1 * | 4/2002 | Kaku ............................. 707/1 |
| 2003/0187547 | A1 * | 10/2003 | Naka et al. .................... 700/245 |
| 2005/0093986 | A1 * | 5/2005 | Shinohara et al. ......... 348/208.1 |
| 2006/0022814 | A1 * | 2/2006 | Nogami et al. ............... 340/505 |
| 2006/0066723 | A1 * | 3/2006 | Iwase et al. .................... 348/169 |
| 2006/0095158 | A1 * | 5/2006 | Lee et al. ....................... 700/245 |
| 2006/0126918 | A1 * | 6/2006 | Oohashi et al. ............... 382/153 |

(Continued)

FOREIGN PATENT DOCUMENTS

| JP | 2002135641 A | * | 5/2002 | ............. H04N 5/232 |
| JP | 2004-242244 A | | 8/2004 | |

(Continued)

OTHER PUBLICATIONS

Ricardo Iglesias; Living Robotic Cameras That Follow People; Jun. 2010; SONAR: International Festival of Advanced Music and Multimedia Art.*

*Primary Examiner* — Roberto Velez
*Assistant Examiner* — Cynthia Segura
(74) *Attorney, Agent, or Firm* — Foley & Lardner LLP (57) ABSTRACT To provide a new framework that can flexibly take images of a moving target in remote monitoring without the need to arrange a plurality of network cameras, an autonomously movable moving body is used to take an image of a photographic target in accordance with a request from a user terminal, and the photographic image is provided to the user terminal. The moving body includes: a position estimating unit that acquires, from a wireless tag reader, a radio field intensity of wireless communication with a wireless tag held by the photographic target to estimate a position of the photographic target based on the acquired radio field intensity; a movement control unit that controls the movement of the moving body so that the moving body moves to the estimated position as a destination; and an imaging unit that takes an image of the photographic target when the moving body is located near the destination, associates the photographic image with a wireless tag ID designated by the request, and transmits the photographic image to an apparatus outside the moving body.

18 Claims, 6 Drawing Sheets

(56) References Cited

U.S. PATENT DOCUMENTS

| | | | |
|---|---|---|---|
| 2007/0003113 A1* | 1/2007 | Goldberg | 382/118 |
| 2007/0192910 A1* | 8/2007 | Vu et al. | 901/17 |
| 2008/0002031 A1* | 1/2008 | Cana et al. | 348/208.14 |
| 2008/0225137 A1* | 9/2008 | Kubo et al. | 348/231.2 |
| 2009/0157221 A1* | 6/2009 | Sip | 700/245 |
| 2009/0239577 A1* | 9/2009 | Holton et al. | 455/556.1 |

FOREIGN PATENT DOCUMENTS

| | | |
|---|---|---|
| JP | 2005-65022 A | 3/2005 |
| JP | 2005-65024 A | 3/2005 |
| JP | 2005-288623 A | 10/2005 |
| JP | 2008-117132 A | 5/2008 |
| JP | 2009-124539 A | 6/2009 |
| JP | 2009-136968 | 6/2009 |
| JP | 2009-147977 | 7/2009 |

* cited by examiner

| IDENTIFICATION INFORMATION OF PHOTOGRAPHIC TARGET | WIRELESS TAG ID | INFORMATION OF MOVING BODY (IP ADDRESS) |
|---|---|---|
| TARO YAMADA | 01234 | 255. 255. 255. 0 |
| HANAKO SUZUKI | 56789 | 255. 255. 255. 1 |

| WIRELESS TAG ID | IMAGE INFORMATION |
|---|---|
| 01234 | ABC.JPG |
| 56789 | DEF.MPG |

IMAGING SYSTEMS, MOVING BODIES, AND IMAGING CONTROL METHODS FOR REMOTE MONITORING OF A MOVING TARGET

CROSS REFERENCE TO RELATED APPLICATION

This application claims the benefit of Japanese Application No. 2009-167900 filed on Jul. 16, 2009 which is incorporated herein by reference.

BACKGROUND OF THE INVENTION

1. Field of the Invention

The present disclosure relates to an imaging system, a moving body, and an imaging control method.

2. Description of the Related Art

In recent years, network cameras that can be controlled from remote places through a communication network, such as the Internet, are in practical use and becoming widely used. For example, an application that uses a Web camera accessible from a WWW client to enable a user to communicate with other user visually or to monitor homes, offices, traffic conditions, etc., is in practical use.

SUMMARY OF THE INVENTION

An example of an application using a network camera includes a remote monitoring system for checking the security from remote places by taking images of children at kindergarten or school, senior citizens at a care facility, and pets in an empty house by the network camera. As the children, senior citizens, and pets freely move, there is a problem in building such a system that a multiplicity of network cameras need to be arranged to cover the movement ranges. Furthermore, to provide photographed images to a concerned party such as a relative, it is desirable to take images of only a specific target for privacy reasons, etc. However, flexible photographing of images of a moving target is difficult in a conventional, fixed network camera.

To solve the problems, it is desirable to provide a new framework that can flexibly take images of a moving target in remote monitoring without the need to arrange a plurality of network cameras.

The present disclosure provides an imaging system comprising: a management server; and an autonomously movable moving body configured to be able to communicate with the management server, the management server comprising: a table storing a correspondence relationship between a photographic target, a wireless tag ID of a wireless tag held by the photographic target, and the moving body; an imaging instructing unit that refers to the table when an imaging request designating the photographic target is received from a user terminal to identify a wireless tag ID and the moving body corresponding to the designated photographic target and to transmit an imaging instruction designating the identified wireless tag to the identified moving body; and an image providing unit that associates and stores the wireless tag ID and a photographic image when the wireless tag ID and the photographic image are received from the moving body and that refers to the table when an image acquisition request designating the photographic target is received from the user terminal to identify the wireless tag ID corresponding to the designated photographic target, to read out the image corresponding to the identified wireless tag ID, and to transmit the image to the user terminal that has transmitted the image acquisition request, the moving body comprising: at least one wireless tag reader configured to be able to read a wireless tag ID from a wireless tag through wireless communication; a position estimating unit that acquires, from the wireless tag reader, a radio field intensity of wireless communication with the wireless tag storing the wireless tag ID designated by the imaging instruction when the imaging instruction is received from the management server to estimate a position of the photographic target based on the acquired radio field intensity; a movement control unit that controls the movement of the moving body so that the moving body moves to the estimated position as a destination; and an imaging unit that takes an image of the photographic target when the moving body is located near the destination, associates the photographic image with the wireless tag ID designated by the imaging instruction, and transmits the photographic image and the wireless tag ID to the management server.

The present disclosure provides an autonomously movable moving body comprising: a position estimating unit that acquires a radio field intensity of wireless communication with a wireless tag held by a photographic target from a wireless target reader to estimate a position of the photographic target based on the acquired radio field intensity; a movement control unit that controls the movement of the moving body to locate the moving body within a certain distance from the estimated position; and an imaging unit that takes an image of the photographic target when the moving body is located within the certain distance.

The moving body of the present disclosure can further comprise at least one wireless tag reader.

The position estimating unit can acquire a signal of wireless communication with the wireless tag held by the photographic target from the at least one wireless tag reader fixed outside the moving body.

The position estimating unit can estimate the position of the photographic target based on a radio field intensity of wireless communication with the wireless tag held by the photographic target.

The moving body of the present disclosure can further comprise an imaging control unit that applies an image recognition process of the photographic target to an image taken by the imaging unit to control the imaging direction based on an image recognition result.

The movement control unit can control the movement of the moving body so that the acquired radio field intensity becomes smaller than a predetermined value when the moving body is located near the destination.

The movement control unit can control the movement of the moving body so that the moving body moves at random or in accordance with a predetermined route when the destination is not set.

The present disclosure provides an imaging system comprising: the moving body of the present disclosure; and a management server configured to be able to communicate with the moving body, the management server comprising an image providing unit that associates and stores a wireless tag ID and a photographic image when the wireless tag ID and the photographic image are received from the moving body and that, when an image acquisition request designating the photographic target is received from the user terminal, identifies the wireless tag ID corresponding to the designated photographic target to read out the image corresponding to the identified wireless tag ID, and to transmit the image to the user terminal that has transmitted the image acquisition request.

The present disclosure provides an imaging control method using an autonomously movable moving body including an imaging unit and a management server configured to be able to communicate with the moving body, the imaging control method comprising: the management server referring to a table storing a correspondence relationship between a photographic target, a wireless tag ID of a wireless tag held by the photographic target, and the moving body when an imaging request designating the photographic target is received from a user terminal to identify a wireless tag ID and the moving body corresponding to the designated photographic target and to transmit an imaging instruction designating the identified wireless tag to the identified moving body; the moving body acquiring, from at least one wireless tag reader, a radio field intensity of wireless communication with the wireless tag storing the wireless tag ID designated by the imaging instruction when the imaging instruction is received from the management server to estimate a position of the photographic target based on the acquired radio field intensity; the moving body moving to the estimated position as a destination; the moving body taking an image of the photographic target when the moving body is located near the destination, associating the photographic image with the wireless tag ID designated by the imaging instruction, and transmitting the photographic image and the wireless tag ID to the management server; the management server associating and storing the wireless tag ID and the photographic image when the wireless tag ID and the photographic image are received from the moving body; and the management server referring to the table when an image acquisition request designating the photographic target is received from the user terminal to identify the wireless tag ID corresponding to the designated photographic target, to read out the image corresponding to the identified wireless tag ID, and to transmit the image to the user terminal that has transmitted the image acquisition request.

CPUs included in the management server and the moving body can implement corresponding processes of the imaging control method of the present disclosure. Programs for the implementation can be installed or loaded through various media such as a CD-ROM, a magnetic disk, a semiconductor memory, and a communication network.

The units in the present specification include units realized by hardware, units realized by software, and units realized using hardware and software. Two or more pieces of hardware may be used to realize one unit, or one piece of hardware may realize two or more units.

DETAILED DESCRIPTION OF THE PREFERRED EMBODIMENT

A preferred embodiment for implementing the present disclosure will now be described with reference to the drawings. In the present embodiment, a system will be described as an example of an application for applying a framework of the present disclosure. The system can take images of a child at kindergarten and provide the photographed images to a concerned party (such as a parent of the child who is a photographic target) in a remote place.

Figure 1:
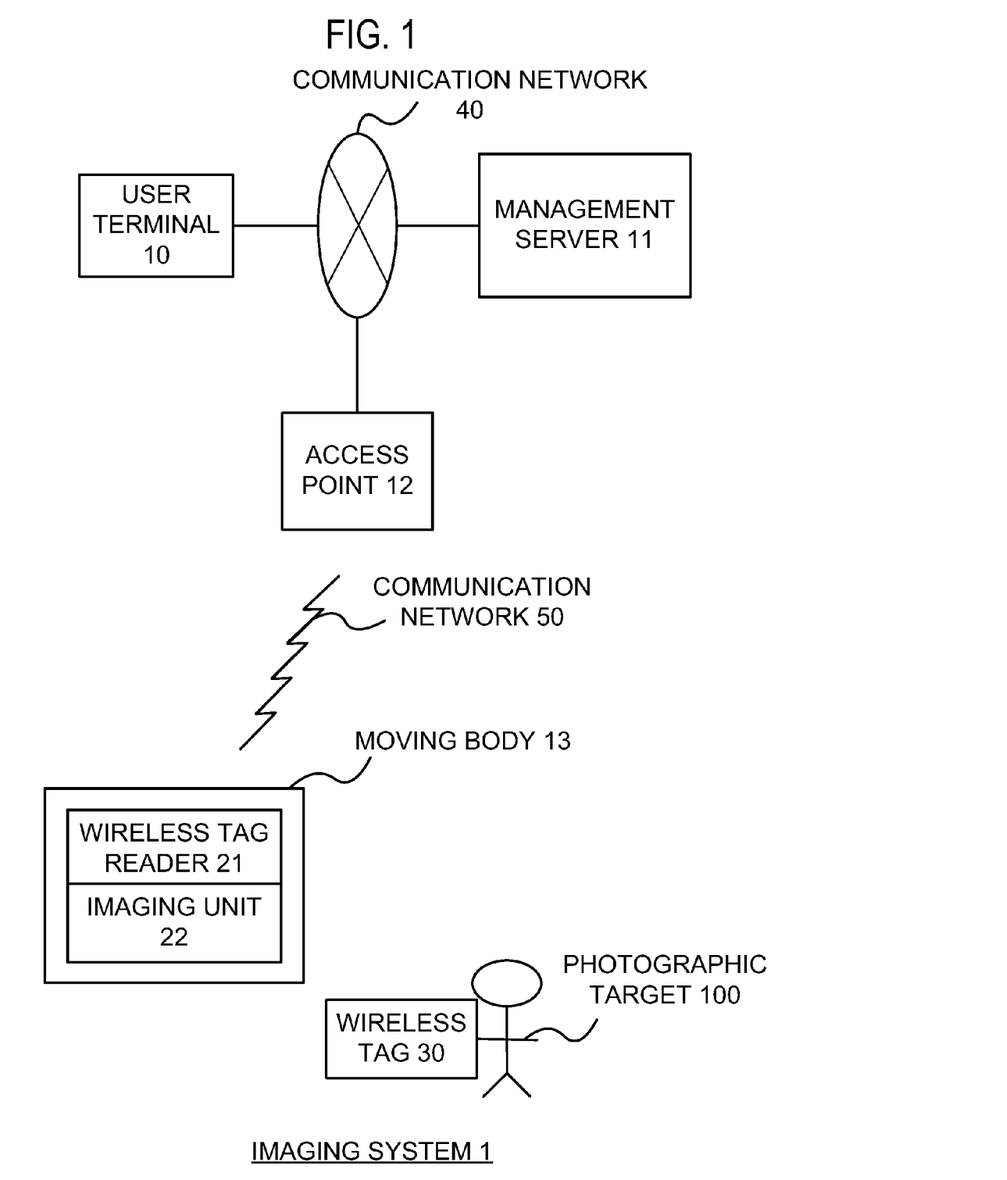
FIG. 1 is a block diagram showing a schematic configuration of an imaging system 1 of the present embodiment.

FIG. 1 is a diagram showing a schematic configuration of an imaging system as an embodiment of the present disclosure. As shown in FIG. 1, an imaging system 1 includes a user terminal 10, a management server 11, an access point 12, an autonomously movable moving body 13, etc. The moving body 13 includes at least one wireless tag reader 21, an imaging unit 22, etc.

The user terminal 10 and the management server 11 can communicate through a communication network 40 such as the Internet. The management server 11 and the moving body 13 are configured to be able to communicate through the communication network 40 and a wireless communication network 50.

Although FIG. 1 illustrates one user terminal 10, management server 11, access point 12, and moving body 13, a plurality of components can be arranged depending on the design.

The imaging system 1 implements a framework in which a photographic target 100 holds a wireless tag 30 readable by the wireless tag reader 21, the wireless tag reader 21 reads tag information of the wireless tag 30 to estimate the position of the photographic target 100 as a target, the moving body 13 moves close to the target, an imaging unit 22 takes images of the target, and the photographed images are provided to the user (such as a parent of a child who is the photographic target).

The wireless tag 30 is configured in the same way as a conventional wireless tag. The wireless tag 30 stores identification information (wireless tag ID) of itself in an internal memory. When the power of a signal transmitted from the wireless tag reader 21 is greater than a predetermined value, the power is supplied by the signal to activate the wireless tag 30, and the wireless tag 30 transmits tag information including the wireless tag ID stored in the memory. The wireless tag 30 can be attached to, for example, a name card, a badge, and a belt for the photographic target to carry.

The user terminal 10 includes an input/output apparatus and is capable of receiving input from the user who uses the imaging system 1 and outputting image information, etc., to the user. A general personal computer or mobile terminal can be used as the user terminal 10. The user terminal 10 may be arranged as a device inside the imaging system 1 or as a device outside the imaging system 1.

The management server 11 has functions such as a remote monitoring function for instructing the moving body 13 to take images of the photographic target 100 in response to a request from the user terminal 10 and providing photographic images obtained from the moving body 13 to the user terminal 10.

Figure 2A:
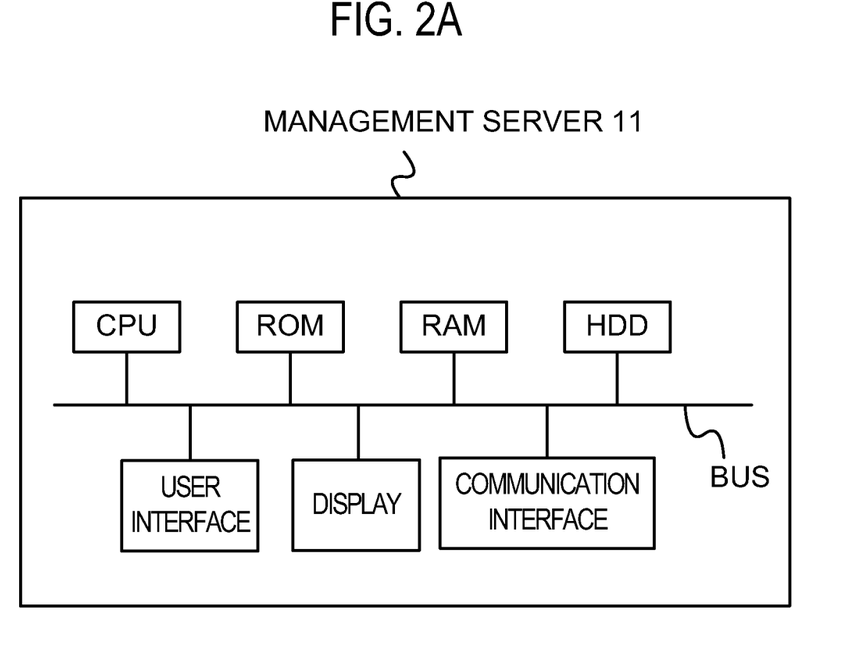
FIG. 2A is a diagram showing a hardware configuration of a management server 11 according to the present embodiment.

FIG. 2A is a block diagram showing a hardware configuration of the management server 11. As shown in FIG. 2A, the management server 11 can be constituted by a general-purpose computer comprising hardware such as a CPU, a memory (ROM or RAM), an HDD, a user interface, a display, and a communication interface.

Figure 2B:
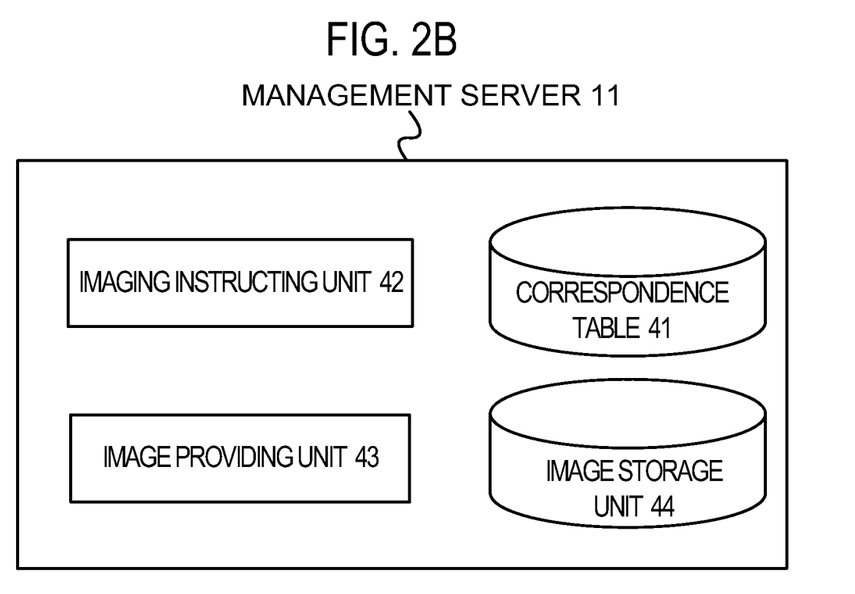
FIG. 2B is a diagram showing a functional configuration of the management server 11 according to the present embodiment.

FIG. 2B is a block diagram showing a functional configuration of the management server 11. As shown in FIG. 2B, the management server 11 includes functional means, such as a correspondence table 41, an imaging instructing unit 42, an image providing unit 43, and an image storage unit 44, to realize the remote monitoring function. However, the management server 11 can be configured to access the correspondence table 41 and the image storage unit 44 directly or indirectly, and although configured as part of the management server 11 in FIG. 2B, the correspondence table 41 and the image storage unit 44 may be under the control of another information process apparatus (such as a database server).

Although not shown, the management server 11 has functions included in a normal Web server, such as a function of communicating with the user terminal 10 and the access point 12 through the communication network 40. Known techniques are used to realize the functions.

Figure 3A:
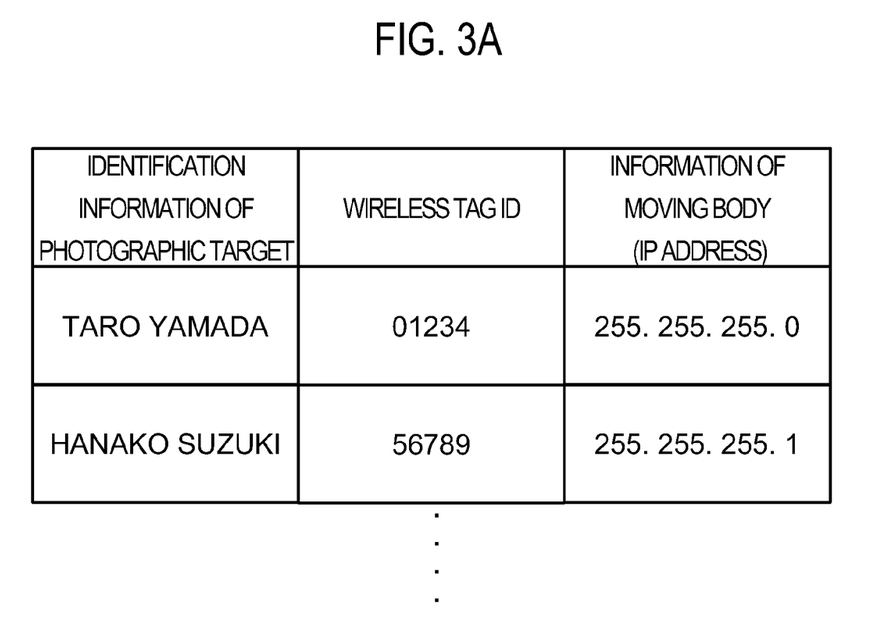
FIG. 3A is a diagram showing an example of data configuration of a correspondence table 41 according to the present embodiment.

The correspondence table 41 stores a correspondence relationship between identification information of the photographic target 100 (such as name and registration number), a wireless tag ID of the wireless tag 30 held by the photographic target 100, and information (such as IP address) of the moving body 13 allocated to the photographic target 100 (and the wireless tag 30 held by the photographic target 100, see FIG. 3A). Arranging the correspondence table 41 and managing the correspondence relationship this way facilitate adding or changing the photographic target 100, the wireless tag 30, and the moving body 13.

The operator, etc., of the imaging system 1 can register the data in advance in the correspondence table 41. Although the photographic target 100 and the wireless tag 30 (wireless tag ID) are associated one to one, a plurality of photographic targets 100 (wireless tags 30 and wireless tag IDs) may be associated with the moving body 13. A conventional database technique, such as a relational database, can be used to manage the data in the correspondence table 41.

When an imaging request designating the photographic target is received from the user terminal 10, the imaging instructing unit 42 refers to the correspondence table 41 to identify the wireless tag ID and the moving body 13 corresponding to the designated photographic target 100 and transmits an imaging instruction designating the identified wireless tag ID (hereinafter, called "target ID) to the identified moving body 13.

When the wireless tag ID and a photographic image are received from the moving body 13, the image providing unit 43 associates and stores the wireless tag ID and the photographic image in the image storage unit 44. When an image acquisition request designating the photographic target is received from the user terminal 10, the image providing unit 43 refers to the correspondence table 41, identifies the wireless tag ID corresponding to the designated photographic target, reads out the image corresponding to the identified wireless tag ID from the image storage unit 44, and transmits the image to the user terminal 10 that has transmitted the image acquisition request.

Figure 3B:
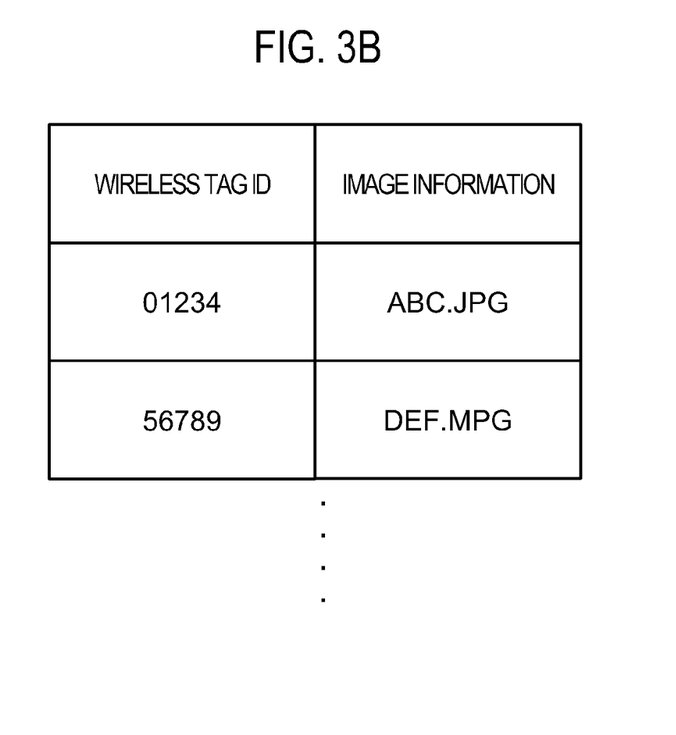
FIG. 3B is a diagram showing an example of data configuration of an image storage unit 44 according to the present embodiment.

The image storage unit 44 associates the image taken by the moving body 13 with the wireless tag ID and stores them (see FIG. 3B). A conventional database technique, such as a relational database, can be used to manage the data in the image storage unit 44.

The access point 12 is equipment for connecting the communication network 40 and the wireless communication network 50 and is realized using a known access point device.

The moving body 13 is an autonomously movable moving body.

The moving body 13 includes a moving mechanism 20, at least one wireless tag reader 21, the imaging unit 22, a communication unit 23, an information processing unit 24, etc. (see FIG. 4A). The moving body 13 may include, for example, various sensors other than the units 20 to 24, and as with the functions included in a conventional autonomously movable moving body, may have various functions such as using values of various sensors to avoid an obstacle.

Figure 4A:
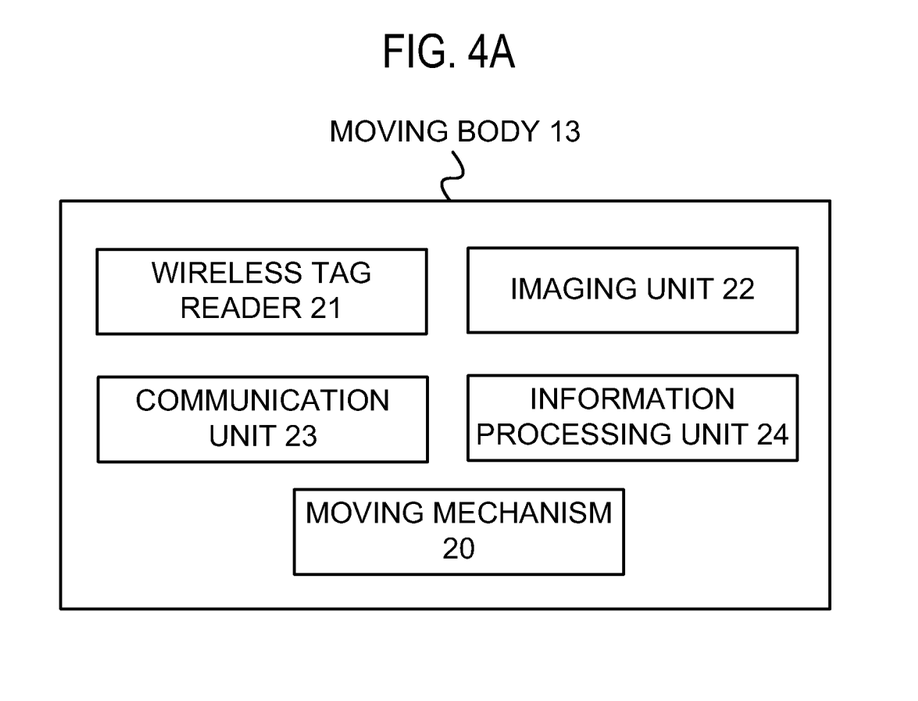
FIG. 4A is a block diagram showing a schematic configuration of a moving body 13 according to the present embodiment.

The moving mechanism 20 is configured in the same way as a moving mechanism included in a conventional autonomously movable moving body, and the type, such as a bipedal moving mechanism and a wheeled moving mechanism, can be appropriately adopted according to the environment in which the moving body 13 is arranged. A known technique can be used to realize the moving mechanism 20.

The wireless tag reader 21 has the same functions as a normal wireless tag reader, such as a reading function of tag information of the wireless tag 30. A known wireless tag reader can be used to realize the wireless tag reader 21.

The imaging unit 22 has functions of taking still images and moving images (including various functions such as zooming, auto focusing, and changing the imaging direction), a function of transmitting the still images and moving images to the management server 11 through the communication unit 23, and other functions. A known network camera can be used to realize the imaging unit 22.

The communication unit 23 has a function of transmitting and receiving data through the wireless communication network 50. A known communication apparatus (such as a wireless communication apparatus compliant with IEEE 802.11b standard) can be used to realize the communication unit 23.

Figure 4B:
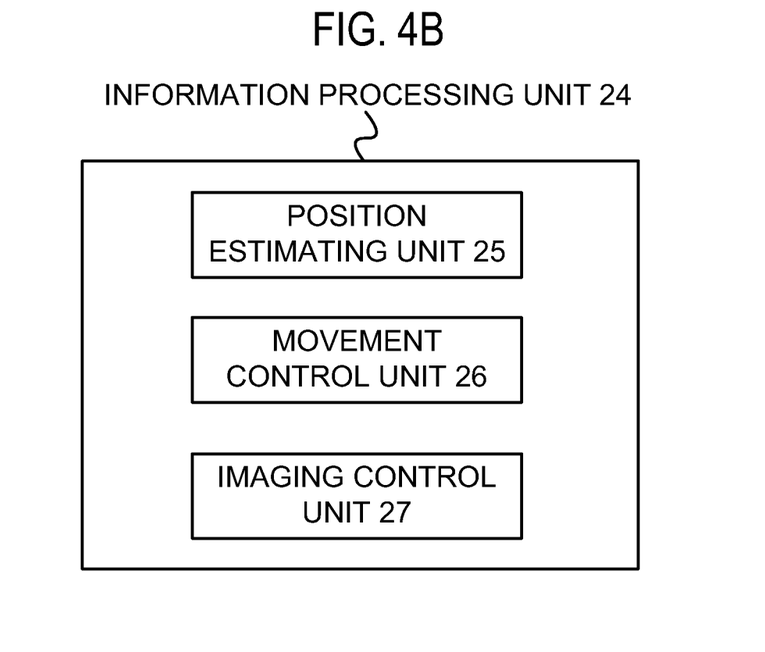
FIG. 4B is a block diagram showing a schematic configuration of an information processing unit 24 according to the present embodiment.

The information processing unit 24 has hardware, such as a CPU, a memory (ROM or RAM), an HDD, etc., and includes a position estimating unit 25, a movement control unit 26, an imaging control unit 27, etc., as functional means realized by the CPU executing programs stored in the memory (see FIG. 4B).

When an imaging instruction transmitted from the management server 11 is received, the position estimating unit 25 acquires, from the wireless tag reader 21, a signal, such as radio field intensity, of wireless communication with a wireless tag storing the target ID designated by the imaging instruction and estimates the position of the photographic target 100 based on the acquired radio field intensity.

The movement control unit 26 controls the movement of the moving body 13 (controls the moving mechanism 20) so that, for example, the moving body 13 moves to the position of the photographic target 100 estimated by the position estimating unit 25 as the destination or that the moving body 13 is within a certain distance from the position of the photographic target 100.

The imaging control unit 27 controls the imaging unit 22 to take an image of the photographic target 100 when the moving body 13 is located near the destination, associate the photographic image with the target ID, and transmit the photographic image and the target ID to the management server 11.

Figure 5:
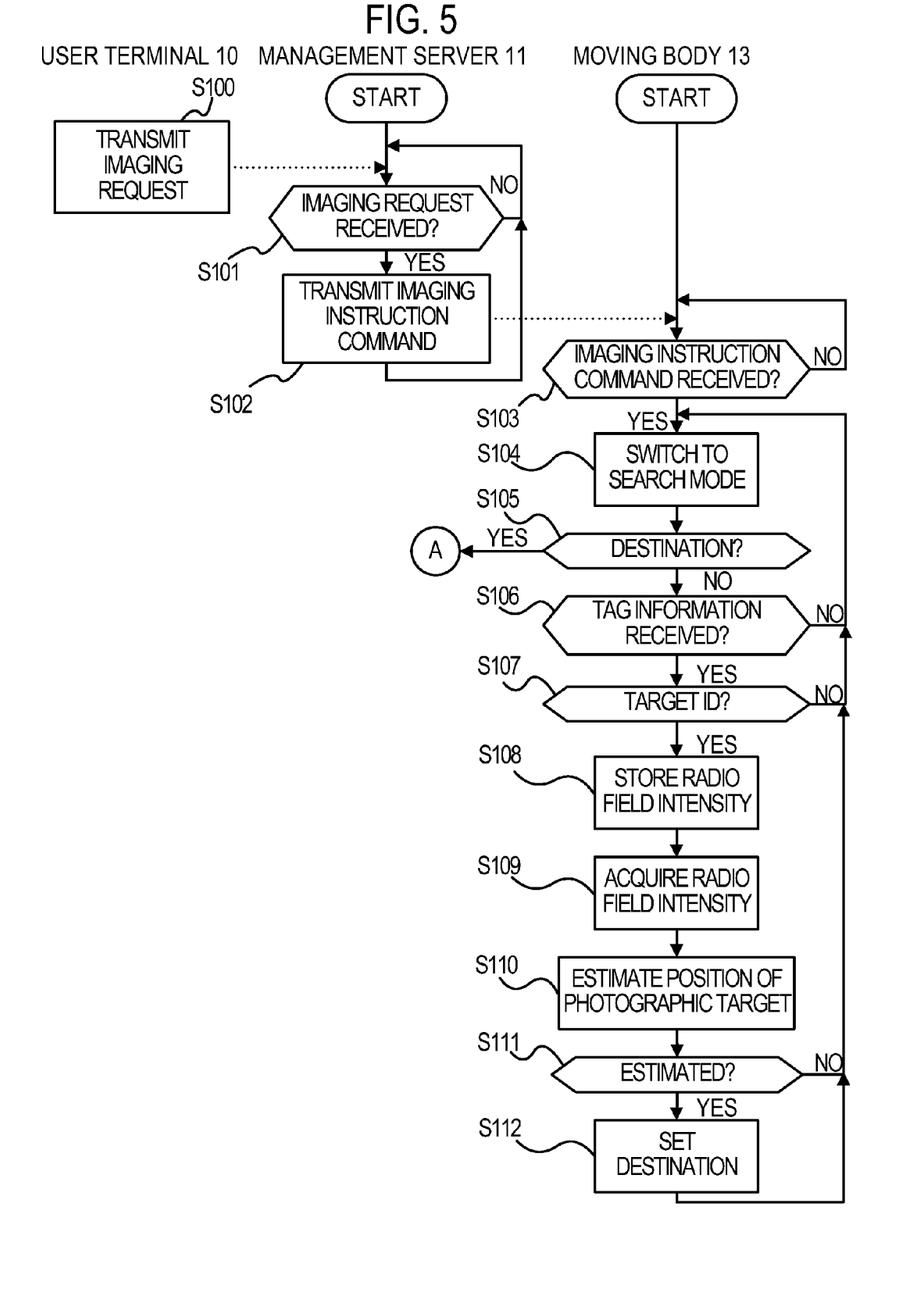
FIG. 5 is a flow chart explaining a framework realized using the imaging system 1 according to the present embodiment.
Figure 6:
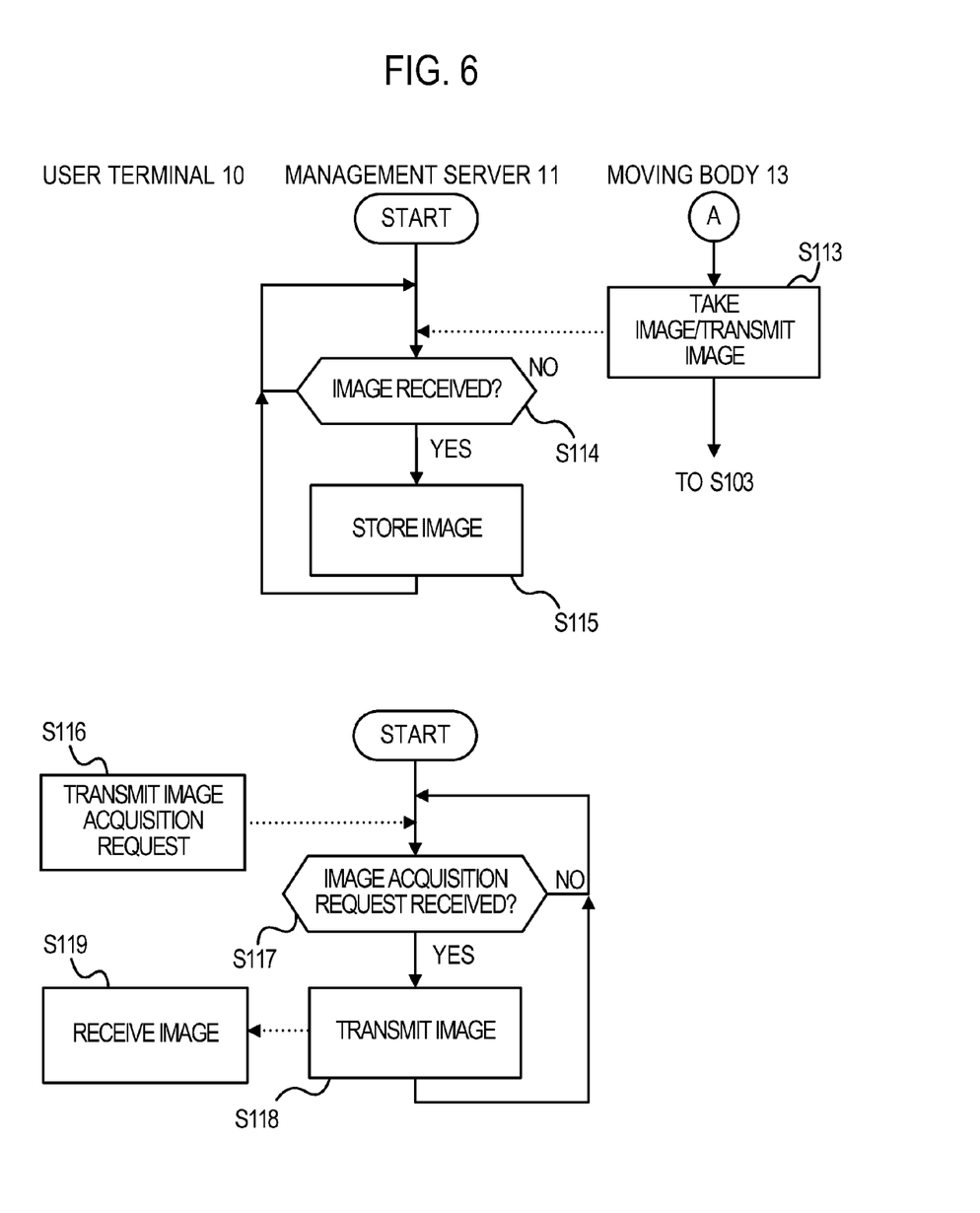
FIG. 6 is a flow chart explaining a framework realized using the imaging system 1 according to the present embodiment.

The framework of the remote monitoring realized using the imaging system 1 will now be described based on flow charts shown in FIGS. 5 and 6. The order of steps (including partial steps not provided with symbols) can be arbitrarily changed, or the steps can be executed in parallel without contradicting the content of processing.

First, the user terminal 10 transmits an imaging request designating identification information of the photographic target 100 (for example, a child of the user) to the management server 11 based on an operation of the user (S100). Such an operation of the user can be performed on condition that the authentication is successful so that the user is an authorized user permitted to use the imaging system 1.

The imaging instructing unit 42 of the management server 11 waits to receive an imaging request to be transmitted from the user terminal 10 (S101). When the imaging request is received (S101: Yes), the imaging instructing unit 42 refers to the correspondence table 41, identifies the wireless tag ID (target ID) and the moving body 13 corresponding to the designated photographic target 100, and transmits an imaging instruction command designating the target ID to the identified moving body 13 through the communication network 40 and the wireless communication network 50 (S102). After the transmission of the imaging instruction command, the management server 11 can transmit an imaging cancel command to the moving body 13 in response to, for example, a request from the user.

The moving body 13 waits to receive an imaging instruction command from the management server 11 (S103), and when the imaging instruction command is received through the communication unit 23 (S103: Yes), the moving body 13 switches to a mode (search mode) for searching the photographic target 100 (S104). The search mode ends in cases such as when an imaging cancel command is received from the management server 11, and then the moving body 13 returns to S103.

In the search mode, if the destination is not set, the movement control unit 26 controls the moving mechanism 20 to make the moving body 13 move at random or in accordance with a predetermined route within an area defined in advance as a range where the photographic target 100 exists (for example, in a classroom of kindergarten). If the destination is set, the movement control unit 26 controls the moving mechanism 20 to make the moving body 13 move close to the destination (for example, within a certain distance (such as 1 m) from the destination).

The movement control unit 26 then determines whether the moving body 13 has arrived near the destination (S105), and if arrived, the process proceeds to S113.

On the other hand, if the moving body 13 has not arrived near the destination, the wireless tag reader 21 included in the moving body 13 determines whether tag information can be received from the wireless tag 30 by wireless communication (S106). If the tag information cannot be received, the process returns to S104, and the search mode continues.

If the tag information can be received, the wireless tag reader 21 determines whether the received tag information includes the target ID (S107). If the target ID is not included, the process returns to S104, and the search mode continues.

If the tag information includes the target ID, the wireless tag reader 21 stores, in the memory, the radio field intensity of the wireless communication when the tag information is received (S108).

The position estimating unit 25 acquires the radio field intensity (radio field intensity of wireless communication with the wireless tag storing the target ID) stored in the memory by the wireless tag reader 21 (S109) and estimates the position of the photographic target 100 based on the acquired radio field intensity (S110).

An example of the position estimation method includes a method of estimating that the photographic target 100 is located in the direction that the radio field intensity is larger.

If, for example, the wireless tag reader 21 can wirelessly communicate with the wireless tag 30 storing the target ID at a plurality of locations within a certain period, the position of the photographic target can be estimated in the following way.

The radio field intensity of wireless communication with the wireless tag 30 is converted into a distance, and a circular area of the distance is set around the position of the wireless tag reader 21 that has performed the wireless communication in a coordinate system with a predetermined reference position as the origin. If wireless communications with the wireless tag 30 can be performed at a plurality of locations, a plurality of circular areas can be set, and the photographic target 100 can be estimated to be in an overlapping area of the plurality of circular areas. If the overlapping area is greater than a certain area, the photographic target 100 may be estimated to be at the center or center of gravity of the overlapping area. In this way, the wireless tag reader does not have to be set in advance in an area in the method in which, using the wireless tag reader 21 included in the moving body 13, the moving body 13 performs wireless communications at a plurality of locations while moving and estimates the position of the photographic target 100. Therefore, the method can also be implemented outdoors, etc.

If wireless communications with the wireless tag 30 storing the target ID cannot be performed at a plurality of locations within a certain period, or if the position of the photographic target 100 cannot be estimated due to a reason such as the radio field intensity is small even though the wireless communications can be performed (S111: No), the process returns to S104, and the search mode continues.

If the position of the photographic target 100 can be estimated (S111: Yes), the movement control unit 26 sets the estimated position of the photographic target 100 as the destination (S112). The process returns to S104, and the search mode continues.

On the other hand, if the moving body 13 has reached near the destination, the imaging control unit 27 controls the imaging unit 22 to take an image in the direction of the position of the photographic target 100, associate the image obtained by photographing with the target ID, and transmit the image and the target ID to the management server 11 (S113). The photographic images may be still images or moving images.

The imaging control unit 27 may use a known image recognition technique to control the imaging direction of the imaging unit 22. For example, face images and features of the photographic target 100 are stored in the memory included in the moving body 13, and a known image recognition technique is used to recognize the photographic target 100 based on the photographic image and the stored face images or features of the photographic target 100. If the photographic target 100 can be recognized, the imaging direction of the imaging unit 22 is controlled to arrange the photographic target 100 at the center of the image. In the image recognition, the privacy of persons other than the target may be secured using the image recognition result to mosaic the part of the image of the persons other than the photographic target 100 as a target.

The movement control unit 26 may use the information of the radio field intensity of wireless communication with the wireless tag storing the target ID to control the distance to the photographic target 100 when the imaging unit 22 takes images. For example, the movement control unit 26 controls the moving mechanism 20 so that the radio field intensity of wireless communication with the wireless tag storing the target ID becomes a predetermined value (for example, about 1 m in distance).

The simultaneous control of the imaging direction by use of the image recognition technique and control of the distance to the photographic target 100 by use of the radio field intensity allow taking images of the photographic target 100 so that the size and the position in the images are always constant.

The imaging control unit 27 controls the imaging unit 22 to take images for a certain number of times or throughout a certain period, for example. When imaging is finished, the moving body 13 returns to S103.

After the transmission of the imaging instruction command, the image providing unit 43 of the management server 11 waits to receive the target ID and the photographic image transmitted from the moving body 13 identified by the imaging instructing unit 42 (S114). When the target ID and the photographic image are received, the image providing unit 43 associates and stores the target ID and the photographic image in the image storage unit 44 (S115).

Meanwhile, the user terminal 10 transmits the image acquisition request designating the identification information of the photographic target 100 (for example, child of the user) to the management server 11 based on the operation of the user (S116).

The image providing unit 43 of the management server 11 waits to receive the image acquisition request designating the photographic target 100 transmitted from the user terminal 10 (S117). When the image acquisition request is received, the image providing unit 43 refers to the correspondence table 41, identifies the wireless tag ID corresponding to the designated photographic target 100, reads out the photographic image corresponding to the identified wireless tag ID from the image storage unit 44, and transmits the photographic image to the user terminal 10 that has transmitted the image acquisition request (S118).

This allows the user terminal 10 to receive the image of the photographic target 100 designated by the imaging request (S119), and the user can see the received image in the user terminal 10.

As described, in the imaging system 1, the moving body 13 including the wireless tag reader 21 and the imaging unit 22 uses the wireless communication with the wireless tag 30 held by the photographic target 100 in response to the imaging request from the user terminal 10 to estimate the position of the photographic target 100, moves close to the photographic target 100 to take an image of the photographic target 100, and provides the photographic image to the user terminal 10. Therefore, according to the imaging system 1, there is no need to arrange a plurality of network cameras to provide photographic images of the photographic target 100, and the moving photographic target 100 can be flexibly followed and photographed.

Especially, the moving body 13 moves close to the photographic target 100 to take an image so that the photographic target 100 can be zoomed and photographed from appropriate position and angle. Therefore, flexible photographing is possible in consideration of privacy, such as by taking images without including persons other than the photographic target 100.

The present disclosure should not be limited to the embodiment, and those skilled in the art can make various changes, additions, and omissions without departing from the concept and scope expressed by the claims.

For example, although an example of the photographic target 100 is a child at kindergarten in the description of the embodiment, a senior in a care facility, etc., may be the photographic target in an application of the present disclosure. Not only persons, but also animals, such as pets, or portable tools may be the photographic target in an application of the present disclosure.

Furthermore, for example, although the Internet, etc., is illustrated as an example of the communication network 40 in the embodiment, the communication network 40 may be any of a LAN, the Internet, a dedicated line, a packet communication network, and a combination of those and may include both wired and wireless networks. A wired communication network may be used instead of the wireless communication network 50, and in that case, various networks can be adopted as in the communication network 40.

Furthermore, for example, although the name and the registration number are illustrated as examples of the identification information of the photographic target 100 in the embodiment, the wireless tag ID of the wireless tag held by the photographic target may be used as the identification information of the photographic target 100.

Furthermore, for example, although the management server 11 transmits an imaging instruction command to the moving body 13 when an imaging request is received from the user terminal 10 in the embodiment, the present disclosure is not limited to such a configuration. For example, if the moving body 13 can wirelessly communicate with a specific wireless tag 30 at more than a certain radio field intensity during circulation or in the search mode, the moving body 13 may estimate the position of the holder of the specific wireless tag 30 in the same way as in the embodiment and move close to the position of the holder to take images of the holder. Alternatively, the moving body 13 may take images of the holder if the holder is located near the moving body 13 so that the movement is not necessary. The photographed images are associated with the wireless tag ID of the specific wireless tag 30 and transmitted to the management server 11, and the management server 11 stores them in the image storage unit 44. If an imaging request is received from the user as in the embodiment, whether the corresponding image of the photographic target is stored in the image storage unit 44 is checked. If the corresponding image photographed within, for example, a certain time (for example, within three minutes) is stored, the corresponding image is read out and provided to the user. According to the configuration, the photographic images can be quickly provided compared to when the images are taken after an imaging request is received.

Furthermore, for example, although the embodiment has described a method of using the wireless tag reader 21 included in the moving body 13 and estimating the position of the photographic target 100 when wireless communications with the wireless tag including the target ID can be performed at a plurality of locations within a certain period, the present disclosure is not limited to the configuration. For example, the moving body 13 may include a plurality of wireless tag readers. According to the configuration, the position of the photographic target can be estimated when a plurality of wireless tag readers can perform wireless communications even if the moving body 13 remains at one location. Alternatively, one or more wireless tag readers are set in advance at a fixed location in an area defined as a range where the photographic target 100 exits, and when the wireless tag reader at the fixed location can perform wireless communication with the wireless tag including the target ID, the radio field intensity of the wireless communication is transmitted to the position estimating unit 25. According to the configuration, the position estimating unit 25 can use radio field intensity information acquired from the wireless tag reader set at the fixed location to estimate the position of the photographic target even if the wireless tag reader 21 cannot wirelessly communicate with the wireless tag including the target ID at the plurality of locations within the certain period. Therefore, the position of the photographic target can be quickly and accurately estimated. The moving body 13 may not include the wireless tag reader 21 if a wireless tag reader is installed at a fixed location.

Furthermore, for example, although the management server 11 stores the photographic images and provides the images to the user in the embodiment, the present disclosure is not limited to the configuration. For example, if the information processing unit 24 of the moving body 13 has a function of a Web server, the photographic images may be stored in the moving body 13 and the moving body 13 may directly receive an image acquisition request from the user terminal 10 to provide the photographic images. In that case, the imaging unit 22 may convert the moving images to video signals of NTSC-J, etc., for streaming distribution.

Furthermore, for example, information (such as name of kindergarten) of an area defined as a range where the photographic target 100 exists may be associated with the identification information of the photographic target 100, etc., and stored in the correspondence table 41. In that case, the user can designate a photographic target 100 and a target area to transmit an imaging request.

What is claimed is:

1. An imaging system comprising:
a management server; and
a single movable body configured to communicate with the management server,
the management server comprising:
a table configured to store a correspondence relationship between a photographic target, a wireless tag ID of a wireless tag held by the photographic target, and the single movable body assigned to a plurality of photographic targets;
an imaging instructing unit configured to refer to the table when an imaging request designating one of the photographic targets is received from a user terminal having a pre-determined relationship to the designated photographic target to identify a wireless tag ID and the single movable body corresponding to the designated photographic target and further configured to transmit an imaging instruction designating the identified wireless tag to the identified single movable body; and
an image providing unit configured to:
associate and store the wireless tag ID and a photographic image when the wireless tag ID and the photographic image are received from the single movable body,
refer to the table when an image acquisition request designating the photographic target is received from the user terminal to identify the wireless tag ID corresponding to the designated photographic target, to read out the image corresponding to the identified wireless tag ID, and to transmit the image to the user terminal that has transmitted the image acquisition request,
wherein the single movable body comprises:
at least one wireless tag reader configured to read a wireless tag ID from a wireless tag through wireless communication;
a position estimating unit configured to acquire, from the wireless tag reader, a radio field intensity of wireless communication with the wireless tag storing the wireless tag ID designated by the imaging instruction when the imaging instruction is received from the management server to estimate a position of the photographic target based on the acquired radio field intensity;
a movement control unit configured to control the movement of the single movable body so that the single movable body moves to the estimated position as a destination;
an imaging unit configured to take an image of the photographic target when the single movable body is located near the destination, associate the photographic image with the wireless tag ID designated by the imaging instruction, and transmit the photographic image and the wireless tag ID to the management server; and
an imaging control unit configured to control he direction of the imaging unit based on a result of an image recognition process.

2. The imaging system according to claim 1, wherein the imaging instructing unit is configured to receive instructions for the single movable body to take images of the photographic target from a user terminal.

3. The imaging system according to claim 1, wherein the position estimating unit is configured to estimate the position of the photographic target based on the magnitude of the radio field intensity.

4. The imaging system according to claim 1, wherein the management server is configured to provide the requested images to the user via the user terminal.

5. The imaging system according to claim 1, wherein the movement control unit of the single movable body is configured to control movement of the single movable body to within a certain distance of the estimated position as a destination by traversing a surface.

6. An imaging system comprising:
a single movable body comprising:
a position estimating unit configured to estimate a position of a photographic target based on a signal of a wireless tag held by the photographic target, the signal acquired from a wireless tag reader, the single movable body assigned to a plurality of photographic targets;
a movement control unit configured to control movement of the single movable body to locate the single movable body within a certain distance from the estimated position;
an imaging unit configured to take an image of the photographic target when the single movable body is located within the certain distance;
an imaging control unit configured to control the direction of the imaging unit based on a result of an image recognition process; and
a communications unit configured to receive instructions, via a server, to take images of the photographic target responsive to a request from a user terminal; and
a management server configured to be able to communicate with the single movable body, the management server comprising an image providing unit that is configured to:
associate and store a wireless tag ID and a photographic image when the wireless tag ID and the photographic image are received from the single movable body,
when an image acquisition request designating one of the photographic targets is received from the user terminal having a pre-determined relationship to the designated photographic target, identify the wireless tag ID corresponding to the designated photographic target to read out the image corresponding to the identified wireless tag ID, and to transmit the image to the user terminal that has transmitted the image acquisition request.

7. The single movable body according to claim 6, further comprising at least one wireless tag reader.

8. The single movable body according to claim 6, wherein the position estimating unit is further configured to acquire a signal of the wireless tag held by the photographic target from the at least one wireless to reader fixed outside the single movable body.

9. The single movable body according to claim 6, wherein the position estimating unit is further configured to estimate the position of the photographic target based on a radio field intensity of wireless communication with the wireless tag held by the photographic target.

10. The single movable body according to claim 9, wherein the movement control unit is further configured to control the movement of the single movable body so that the acquired radio field intensity becomes smaller than a predetermined value when the single movable body is located near the destination.

11. The single movable body according to claim 6, wherein the movement control unit is further configured to control the movement of the single movable body so that the single movable body moves at random or in accordance with a predetermined route when the destination is not set.

12. The single movable body according to claim 6, wherein the imaging unit is configured to transmit an image of the photographic target, via a server, to the user terminal.

13. The single movable body according to claim 6, wherein the position estimating unit is configured to estimate the position of the photographic target based on the magnitude of the radio field intensity.

14. The single movable body according to claim 6, wherein the movement control unit is configured to control movement of the single movable body to within a certain distance of the estimated position as a destination by traversing a surface.

15. An imaging control method using a single movable body including an imaging unit and a management server configured to communicate with the single movable body, the imaging control method comprising:
the management server receiving an imaging request designating identification information of a photographic target from a user terminal;
the management server referring to a table storing a correspondence relationship between the photographic target, a wireless tag ID of a wireless tag held by the photographic target, and the single movable body assigned to a plurality of photographic targets, when the imaging request designating one of the photographic targets is received from the user terminal having a predetermined relationship to the designated photographic target to identify a wireless tag ID and the single movable body corresponding to the designated photographic target and to transmit an imaging instruction designating the identified wireless tag to the identified single movable body;
the single movable body acquiring, from at least one wireless tag reader, a radio field intensity of wireless communication with the wireless tag storing the wireless tag ID designated by the imaging instruction when the imaging instruction is received from the management server to estimate a position of the photographic target based on the acquired radio field intensity;
the single movable body moving to the estimated position as a destination;
the single movable body taking an image of the photographic target when the single movable body is located near the destination, wherein an imaging control unit is configured to control the direction of the single movable body based on a result of an image recognition process, associating the photographic image with the wireless tag ID designated by the imaging instruction, and transmitting the photographic image the wireless tag ID to the management server;
the management server associating and storing the wireless tag ID and the photographic image when the wireless tag ID and the photographic image are received from the single movable body; and
the management server referring to the table when an image acquisition request designating the photographic target is received from the user terminal to identify the wireless tag ID corresponding to the designated photographic target, to read out the image corresponding to the identified wireless tag ID, and to transmit the image to the user terminal that has transmitted the image acquisition request.

16. The imaging control method according to claim 15, further comprising:
an imaging instructing unit of the moving body receiving instructions for the single movable body to take images of the photographic target from the user terminal.

17. The imaging control method according to claim 15, further comprising:
a position estimating unit of the single movable body estimating the position of the photographic target based on the magnitude of the radio field intensity.

18. The imaging control method according to claim 15, further comprising:
the management server providing the requested ages to the user via the user terminal.

* * * * *

UNITED STATES PATENT AND TRADEMARK OFFICE
CERTIFICATE OF CORRECTION

PATENT NO.        : 8,817,118 B2                                                             Page 1 of 1
APPLICATION NO.   : 12/641115
DATED             : August 26, 2014
INVENTOR(S)       : Hatanaka It is certified that error appears in the above-identified patent and that said Letters Patent is hereby corrected as shown below:

In the Claims

In Column 12, Line 16, in Claim 1, delete "he" and insert -- the --, therefor.

In Column 13, Line 11, in Claim 8, delete "to" and insert -- tag --, therefor.

In Column 14, Line 24, in Claim 15, delete "image" and insert -- image and --, therefor.

In Column 14, Line 50, in Claim 18, delete "ages" and insert -- images --, therefor.

Signed and Sealed this
Twenty-third Day of December, 2014

Michelle K. Lee
*Deputy Director of the United States Patent and Trademark Office*